Jan. 14, 1930.                F. E. WOLCOTT                 1,743,301
                        ELECTRICAL HEATING DEVICE
                          Filed Oct. 29, 1926
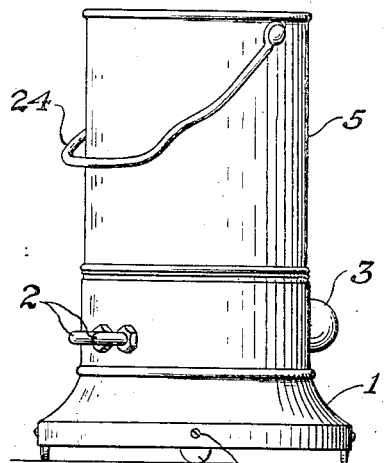
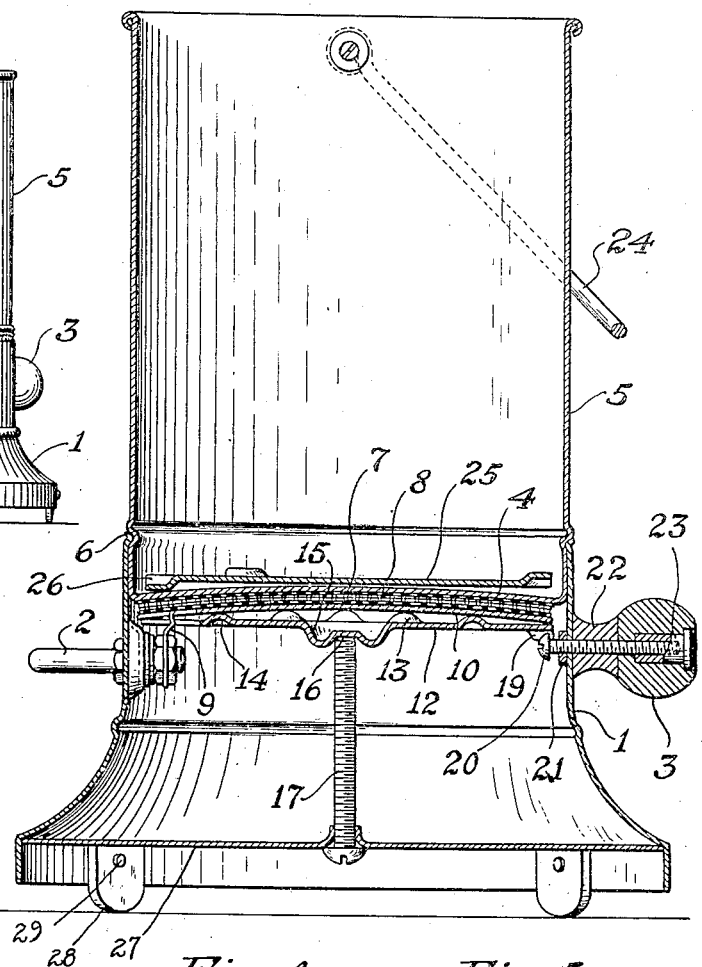
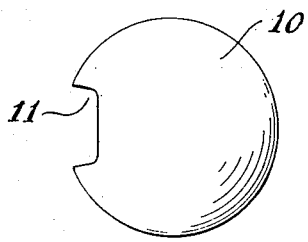
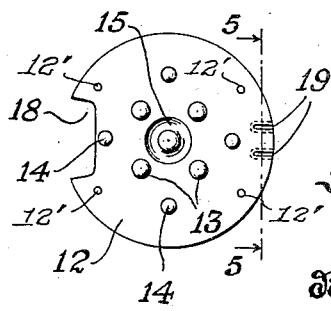
Inventor
Frank E. Wolcott
By
Attorney.

Patented Jan. 14, 1930

1,743,301

UNITED STATES PATENT OFFICE

FRANK E. WOLCOTT, OF WEST HARTFORD, CONNECTICUT, ASSIGNOR, BY MESNE ASSIGNMENTS, TO THE BEARDSLEY & WOLCOTT MFG. CO., A CORPORATION OF CONNECTICUT

ELECTRICAL HEATING DEVICE

Application filed October 29, 1926. Serial No. 145,038.

My invention relates to electrical heating devices.

It has for its object to provide an improved heating device, and more particularly, such a device adapted to function efficiently in conjunction with a device to be heated having a curved or cupped portion to be heated or, more especially, a receptacle having a thin or flexible bottom adapted to cup upward when pressure is applied below the same, my invention comprising improved means adapted to function with such a device or receptacle and to provide for uniform conduction of heat thereto through the elimination of air pockets tending to cut down the heating efficiency. These and other objects of my improved construction will, however, hereinafter more fully appear.

In the accompanying drawings, I have shown for purposes of illustration, one embodiment which my invention may assume in practice, illustrating the same herein in conjunction with a so-called emergency heater, although it will be understood that the invention is in no wise limited to use in connection therewith, and that it may be used in conjunction with any desired device to be heated having a curved or flexible bottom.

In these drawings,—

Fig. 1 is a side elevation of this heater equipped with my improvement;

Fig. 2 is an enlarged vertical sectional view thereof;

Fig. 3 is a detail plan view of the cupped plate cooperating with the heating element and underlying the same;

Fig. 4 is a detail plan view of the carrier plate underlying the cupped plate;

Fig. 5 is an enlarged sectional view on line 5—5 of Fig. 4, showing the lugs for holding the latter plate against rotation, and Fig. 6 is a detail plan view of a bottom plate adapted to be carried in an emergency heater such as shown.

In this illustrative construction, it will be noted that I have shown a receptacle base 1 of any suitable construction, herein having terminal connections 2 and a handle 3 on opposite sides of the same, and adapted to carry therein my improved heating unit so that the latter may cooperate with the cupped or flexible bottom 4 of a suitable receptacle 5 carried by the base 1 and herein seated therein and connected thereto through a suitable quick detachable bead and groove connection 6.

Referring more particularly to the heating unit, it will be noted that this is adapted to contact with the bottom 4 of the receptacle 5 in such manner as to conduct the heat uniformly to the bottom throughout the whole area thereof, all air pockets or the like, tending to reduce the heating efficiency of the heating unit, being eliminated by my improved construction. More especially, it will be noted that the bottom 4 of the receptacle has disposed immediately against it a heating element or unit comprising a usual cover and core. This heating element herein comprises flexible strips 7 of insulating material as, for example, mica, and an enclosed heating element 8, which is likewise flexible so that the whole heating element may conform to the bottom 4 of the receptacle to be heated, this heating element herein being connected through suitable wire or ribbon connections 9 with the terminals 2. Moreover, it will be noted that under this heating element I have herein provided a cupped plate 10, herein, as preferably, formed of sheet metal and so shaped as to cup the bottom 4 of the receptacle when pressed upward and be adapted to engage and press the flexible heating element, which overlies this cupped plate, into efficient heat conducting relation with the receptacle bottom 4 throughout the area of the latter and the heating element. This plate 10 herein also has a cut-away portion 11 at one side thereof to permit the passage therethrough of the connections 9. Attention is, moreover, directed to the fact that a bottom or pressure plate 12 is herein seated beneath the plate 10, and that this plate 12 is so constructed that it may press the plate 10 uniformly upward and thereby bring about the desired heat conducting relationship between the bottom 4 and the heating element. More particularly, it will be noted that this plate 12, which is herein also formed of sheet metal, is provided with a series of spaced raised portions 13, herein four, surrounding its axis and relatively closely adjacent the same which engage the cupped surface of the plate 10 and increase its rigidity while distributing any upward pressure on the same over the area of this plate 10. As shown herein, one or more lower raised portions 14, nearer the outer periphery of the plate 12, may also be provided, if desired. Thus, the plate 12 and the uppermost surfaces of its raised portions 13 function with the plate 10, and with the portions 14 when the latter are used, to produce, in effect, when pressed together, a rigid convex plate having a conical pressure area adapted to cooperate with the heating unit. Further, the plate 12 with its projections 13, or 13 and 14, also provides a construction which is adapted to cooperate with the cupped plate 10 and, by distributing the pressure at all times uniformly over substantially the whole area of the latter, prevent buckling thereof when the same is heated, and thereby cause substantially the whole area of the heating element to be maintained tightly pressed against the receptacle bottom regardless of increases in temperature. If desired, the several elements comprising the heating unit, the plate 10 and the plate 12 may be united, as by extending the usual heating unit rivets through suitable apertures provided in the plate 12, each of which is herein indicated at 12'. Here attention is also directed to the fact that this lower plate 12 has a groove or depression 15 around its axis tending to stiffen the same, and also a central socket 16 therein, and that the raised portions 13 and 14 cooperate therewith to produce a very rigid member which is free from buckling, even when heated, and thus is at all times adapted to transmit a uniform pressure to substantially the whole area of the plate 10 and of the resistance element. The socket 16 is also adapted to receive the upper end of a screw 17 adjustable from below the base and extending axially up through and threaded in the bottom of the base 1 so that the rigidity of the structure is increased and adjustment of this screw will cause the plate 12 to be pressed into contact with the plate 10, and thereby press the heating element into the desired intimate contact with the bottom 4. It will also be noted that the plate 12 is herein provided with an aperture 18 adapted to register with the aperture 11 in the plate 10 and permit the passage of the connections 9. The plate 12 is also provided on its bottom and opposite this aperture 18 with bent down straight lugs 19 disposed in parallel relationship to one another and at the edge of the plate. These lugs are adapted to cooperate with the end of a screw 20 extending through the side of the base 1 and acting as a support for the handle 2. This screw 20 herein extends through a suitable nut 21 inside the base, a spacing and heating insulating member 22 outside the base, and thereafter through the handle 3, the screw being received in and held in position in a suitable aperture in the latter by an internally threaded screw 23. Thus, it will be noted that the plate 12 is held against rotation within the base 1 by engagement with the same means which acts to attach the handle 3 to the base.

In this illustrative construction, in which a so-called emergency heater is shown the latter comprises an elongated tubular receptacle 5 open at its top and having herein a bail 24 pivoted close to the top thereof and having its sides so bent as to provide a projecting grasping portion which does not contact with the side of the receptacle. Attention is also directed to the fact that the handle 3 is on the opposite side from the terminals 2 and that the handle and terminals are each spaced around the circumference of the receptacle 90° from the pivots of the bail. Thus, the handle 3 is not only so located and constructed as to be cool and convenient for use during pouring, i. e. when the device is held suspended by the bail, but so located relative to the terminals 2, i. e. on the opposite side of the base therefrom, in such manner as to be exceedingly convenient when it is desired to pull off the plug from the terminals 2 when the receptacle is hot; the location of the handle in this position opposite the terminals permitting it to be held in one hand while the plug is removed with the other, and also eliminating danger of tilting should the plug stick. Means are also provided to supply a proper seat for and prevent breakage of the article to be heated, as, for example, a bottle, when the latter is inserted in the emergency heater. More particularly, a supporting plate 25 is supported on the bottom 4 of the receptacle, and this plate is provided with means, herein in the form of alternately bent up and down projections or lugs 26 located around the periphery of the plate so that, despite the raised center of the bottom 4 the plate will be properly supported on the latter, the bent down projections 26 then acting as supports for the plate 25, while the bent up projections 26 serve to support or center the article to be heated. In this connection, it will be understood that such a plate 25 may be used whenever it is desired to have an article to be heated supported in the receptacle 5, whereas when my invention is used in connection with a device in which the fluid or material to be heated is carried directly on the bottom 4, as, for example, in a percolator, the need for such a plate does not exist. Here it should also be understood that when the invention is embodied in a device such as a percolator, the latter may be permanently connected to the base in any suitable manner, if desired, and made a permanent part of the structure.

Attention is also directed to the fact that the bottom of the base 1 is in the form of a sheet metal plate member 27 held in place by peripherally located base supporting feet 28, preferably of insulating material as usual in such devices, and herein removably attached to the member 1 by screws 29.

In the use of my invention it is found that by reason of the construction of the unit and its cooperating pressure plates, a very intimate contact is provided between the whole area of the heating element and the receptacle bottom, all air spaces, buckling, or sagging being eliminated, with a resultant uniform conduction of heat, this result being obtained at the same time that it is made possible to utilize the desired thin material as the bottom of the receptacle. Moreover, it will be noted that the heating unit and its cooperating plates are so constructed and arranged as to permit of the desired support thereof without discoloring the walls of the base which are spaced laterally therefrom, and that through the adjusting screw and the interlocking connection between the bottom plate 12 and the screw 20, the parts are definitely located. It will also be observed that through the single screw 17 and its threaded connection to the bottom of the base 1 it is made possible quickly and conveniently to increase the pressure of the plate 10 against the heating element and of the latter against the bottom 4 of the receptacle, thereby compensating for any expansion of the parts during heating. Through this connection the tension of the bottom of the base 1 is also effectively utilized in each position. Moreover, through the improved construction provided it is made possible to produce an efficient construction very cheaply, the parts being largely metal stampings. Access to the heating element and any of the connections inside the base may also be readily had at any time through the removable bottom or tensioning plate. These and other advantages will, however, be apparent to those skilled in the art.

While I have in this application specifically described one embodiment which my invention may assume in practice, it is to be understood that the invention may be modified and embodied in various other forms without departing from its spirit or the scope of the appended claims.

What I claim as new and desire to secure by Letters Patent is:

1. A heating device comprising a heating element adapted to cooperate with a cupped surface, and rigid means conforming to said surface adapted to press said element outward into contact with the cupped area thereof.

2. A heating device comprising a heating element, means to be heated presenting a curved surface engagable thereby, and rigid means conforming to said surface when heated and uniformly pressing substantially the whole area of said element outward into contact therewith.

3. A heating device comprising a heating element, means to be heated presenting an upwardly cupped surface engagable thereby, and rigid substantially conical pressure means conforming to said surface at all times and uniformly pressing substantially the whole area of said element outward into contact therewtih.

4. A heating element comprising a curved heating element, a curved supporting plate therefor operable upon substantially the whole area thereof, and means acting on the latter and having a pressure area conforming to the surface of said plate and pressing substantially the whole area of said element into contact with a surface to be heated including means for moving said pressure area toward said element.

5. A heating device comprising a heating element curved to engage and cooperate with a curved surface, a curved supporting plate therefor, and rigid means acting on said plate and presenting a pressure area conforming to said surface and pressing substantially the whole area of said plate into contact with said element when the parts are heated.

6. A heating device comprising a heating element adapted to cooperate with a curved surface, rigid means conforming to said surface and pressing said element outward into contact with said surface with a substantially uniform pressure over the whole area of said element, and means for moving said rigid means toward said element.

7. A heating device comprising a heating element adapted to cooperate with a curved surface, means conforming to said surface and holding said element in contact with said surface including a curved supporting plate and rigid means distributing pressure substantially uniformly over the whole area of the latter, and means for moving said rigid means toward said element.

8. A heating device comprising a heating element adapted to cooperate with a curved surface, and means conforming to said surface and holding said element in contact with said surface including a curved supporting plate operative upon substantially the whole area of the heating element, a rigid pressure plate operative upon substantially the whole area of a curved surface of said supporting plate, and means for pressing the elements against the first mentioned curved surface.

9. A heating device comprising a flexible heating element, a cupped supporting plate therefor, and a pressure plate having raised portions of different height engaging said supporting plate.

10. A heating device comprising a flexible heating element, a cupper supporting plate therefor, and a pressure plate having portions of different height engaging said supporting plate and axially located stiffening means.

11. A heating device comprising a flexible heating element, a cupped supporting plate therefor, and a pressure plate having radially disposed raised portions engaging said supporting plate and axially located stiffening means presenting a cup adapted to receive an adjusting element.

12. In combination, a curved member to be heated, a curved heating unit therefor, a curved plate supporting said unit and operative upon substantially the whole area thereof, and pressure means including a pressure plate supporting said curved plate and having means adapted to apply a uniform pressure to substantially the whole area of said curved plate and of said heating unit and adjustable toward the same.

13. In combination, a cupped member to be heated, a heating unit therefor conforming thereto, and pressure means including a pressure plate underlying said heating unit and having means located inside the periphery of said pressure plate adapted to maintain an axial pressure toward said cupped member on substantially the whole area of said unit during heating.

14. In combination, a cupped member to be heated, a heating unit therefor conforming thereto, and means including a pressure plate underlying said heating unit and having pressure means located inside the periphery of said pressure plate and cooperating means for moving said pressure means axially toward said unit adapted to maintain substantially the whole area of said unit pressed close against said cupped member during heating.

15. A heating device comprising a heating unit, a cupped supporting plate fitting the same, a pressure plate, supporting projections engaging said supporting plate and located at different points about the axis of said pressure plate, and means for pressing said pressure plate and projections toward said supporting plate.

16. In a heating device, a heating element, a cupped supporting plate operative upon substantially the whole area thereof, a cooperating pressure plate presenting in effect a rigid conical pressure area acting on substantially the whole area of said supporting plate, and axially adjustable means exerting pressure on said pressure plate.

17. In combination, a cupped member to be heated, a heating element fitting the same, and means for applying pressure to said heating element including a cupped supporting plate engaging said element and a pressure plate supporting said supporting plate at a plurality of spaced points and adapted to transmit pressure uniformly to the cupped surface thereof.

18. In combination, a base, a heating element therein, means for supplying pressure thereto including a supporting plate therefor and a pressure plate supporting said supporting plate and adapted to apply pressure thereto, said elements being spaced from the side walls of said base, and axial pressure applying means supporting said pressure plate in spaced relation from the bottom of said base.

19. In combination, a base, a flexible heating element therein, a cupped supporting plate for said element, a pressure plate supporting said supporting plate and having raised means thereon adapted to apply uniform pressure thereto, and means between said base and pressure plate for adjusting the latter to vary the pressure thereof.

20. In combination with a device to be heated having a flexible bottom adapted to cup upward when pressure is applied below the same, a heating unit engaging said bottom and adapted to conform thereto, and means adapted to press said unit upward into heat conducting relation with said bottom when the latter is cupped and to provide a rigid non-buckling support for the whole area of said heating unit.

21. In combination with a device to be heated having a flexible bottom adapted to cup upward when pressure is applied below the same, a heating unit engaging said bottom and adapted to conform thereto, and means adapted to press said unit upward into heat conducting relation with respect to said bottom when the latter is cupped and to provide a rigid non-buckling support for the whole area of said heating unit and including an axially movable member movable relative to said device.

22. In combination with a device to be heated having a flexible bottom, a flexible heating unit, and means adapted to press the same into heat conducting relation with said bottom including a rigid pressure plate presenting a convex pressure surface comprising a plurality of spaced pressure areas of different height disposed between the axis and periphery thereof.

23. In combination with a device to be heated having a flexible bottom adapted to cup upward when pressure is applied below the same, a flexible heating unit, and means adapted to press the same into heat conducting relation with said bottom including a cupped supporting plate and a pressure plate adapted to exert uniform pressure on the latter and having a plurality of spaced pressure areas engaging therewith.

24. In combination with a device to be heated having a flexible bottom adapted to cup upward when pressure is applied below the same, a heating unit, and means adapted to press the same into heat conducting relation with said bottom including a cupped supporting plate and a pressure plate presenting a convex pressure area engaging said supporting plate in a pluralty of zones surroundng its axis.

25. In combination with a device to be heated having a flexible bottom adapted to cup upward when pressure is applied below the same, a heating unit, and means adapted to press the same into heat conducting relation with said bottom including a cupped supporting plate, a pressure plate presenting a pressure area conforming to the shape of the supporting plate, and single axial means movable to adjust the pressure of said pressure plate.

26. In combination with a device to be heated having a cupped bottom, a heating element conforming thereto, means adapted to press the same into heat conducting relation with said bottom including a pressure plate presenting a pressure area conforming to the shape of said bottom and a member adjustable to adjust said pressure area axially upward, and a base supporting said adjusting member and enclosing said element and said plate and supporting the same and spaced from the peripheries thereof.

27. In combination with a device to be heated having a flexible bottom, a flexible heating unit, cooperating means adapted to press the same into heat conducting relation with said bottom including a cupped plate and a rigid pressure plate engaging therewith, a base enclosing said element and said plates spaced from the peripheries thereof and vertically from said pressure plate, and means on said base for supporting said pressure plate and preventing rotation thereof.

28. A pressure plate for electric heaters having a series of projections cooperating with said plate to provide a substantially conical pressure area.

29. A pressure plate for electrical heaters having projections around its axis and one or more projections of lower height farther removed from its axis.

30. A pressure plate for electric heaters having projections around its axis and one or more projections of lower height farther removed from its axis and also a stiffening depression within said first mentioned projections.

31. A pressure plate for electric heaters having projections around its axis, a stiffening depression within said projections and provided with an axial socket, a cut-away portion in one side, and depending lugs on the opposite side thereof.

32. In combination, a base, a heating element, a supporting plate therefor, a pressure plate adapted to exert pressure on said supporting plate, said elements being spaced from the side walls of said base, terminals on the side walls of said base having connections extending to said element, a supporting and adjusting screw supporting said pressure plate in said base and a handle on said base having a portion interlocked with said pressure plate to hold the latter against rotation.

33. The combination with a utensil having a bottom provided with a raised center, of a supporting plate disposed over said center and having peripherally located oppositely disposed series of projections forming supporting means and article centering means on opposite surfaces of said plate.

34. A supporting plate for electric heaters adapted to be seated in a receptacle having a raised bottom and having radially located oppositely disposed series of projections each adapted to form a supporting means disposing the body of the plate in adjacency to said bottom while the other series forms article centering means.

35. In combination, a base having a sheet metal bottom member and an upper vertically spaced surface to be heated a heating element therein engageable with said surface, pressure plate means spaced from said bottom member and acting upon said element, and an axial threaded screw engaging said plate means at its upper end and threaded in and tensioned by said bottom member.

36. In combination, a receptacle having a closed bottom a base receiving said receptacle in its upper end and having a bottom tensioning plate below said bottom, a heating element engagable with the bottom of the receptacle, and pressure means utilizing the axis of said tensioning plate as its bottom abutment and comprising a single axial adjusting screw threaded in and projecting through the tensioning plate in opposite directions and pressure plate means engaged by the upper end of said screw and pressing said element into contact with said bottom.

37. In combination, a tubular receptacle having a closed bottom, a base receiving said receptacle in its upper end and having a bottom plate spaced from the bottom thereof, a heating element engagable with the bottom of the receptacle, pressure means pressing said element into contact with said bottom including pressure plate means and an axial adjusting screw engagable therewith and adjustable through said bottom plate, terminal connections on said base below said heating element and connected thereto, and means on said base below said bottom engaging with said pressure plate means to prevent rotation thereof.

38. An electrical heating device comprising a base and having a surface to be heated, a heating element in said base engaging said surface, pressure plate means engaging said element, a tensioning plate in the bottom of said base, means holding said plate in position, and an axially located member adjustable in said tensioning member from the bottom thereof having its upper end pressing said pressure plate means into engagement with said heating element and the latter into engagement with the surface to be heated.

39. An electrical heating device comprising a base and having a surface to be heated, a heating element in said base engaging said surface, pressure plate means engaging substantially the whole area of said element, a member in said base below said means, radially located base supporting members holding said member in position in said base, and a member adjustable in said last mentioned member from the bottom thereof having its upper end pressing said pressure plate means toward said heating element and the latter toward the surface to be heated.

40. An electrical heating device comprising a base and having a surface to be heated, a heating element in said base engaging said surface, pressure plate means engaging said element, a tensioning plate in the bottom of said base, base supporting feet holding said plate in position, an axially located threaded member threaded in said tensioning member and adjustable from the bottom thereof having its upper end pressing said pressure plate means into engagement with said heating element and the latter into engagement with the surface to be heated, and means carried by said base interlocking with said plate means to prevent rotation thereof.

41. In combination, a tubular receptacle having a closed bottom and a base below the bottom of said receptacle, a heating element within said base engaging the bottom of said receptacle, terminal connections projecting through said base below the bottom of said receptacle and connected to said heating element, and a handle projecting from said base at a point on the opposite side thereof from said terminal connections and likewise connected to said base below said bottom.

42. In combination, a tubular receptacle having a closed bottom, a bail pivoted on its top, a base, a heating element within said base engaging the bottom of said receptacle, terminal connections projecting through said base below the bottom of said receptacle and connected to said heating element, and a handle projecting from said base at a point on the opposite side thereof from said terminal connections and likewise connected to said base below said bottom, said terminals and handle being so spaced around the receptacle as to extend substantially at right angles to the pivots of said bail.

43. In combination, an elongated tubular receptacle having a closed bottom and having a bail on its top and a base having a bottom plate spaced below the bottom of said receptacle, a heating element within said base engaging the bottom of said receptacle, pressure means pressing said element into contact with said bottom including pressure plate means and an axially adjustable member engaging therewith and extending through said bottom plate and adjustable from below the same, means between said base and pressure plate means to prevent rotation of the latter, terminal connections projecting through said base below said heating element and connected thereto, and a projecting handle on said base below said bail.

In testimony whereof I affix my signature.

FRANK E. WOLCOTT.